United States Patent [19]

Sheibley

[11] 4,085,241
[45] Apr. 18, 1978

[54] INORGANIC-ORGANIC SEPARATORS FOR ALKALINE BATTERIES

[75] Inventor: Dean W. Sheibley, Sandusky, Ohio

[73] Assignee: The United States of America as represented by the United States National Aeronautics and Space Administration, Washington, D.C.

[21] Appl. No.: 720,521

[22] Filed: Sep. 7, 1976

[51] Int. Cl.$^2$ .............................................. H01M 3/02
[52] U.S. Cl. ........................... 427/385 B; 427/385 C; 429/254
[58] Field of Search ............... 429/136, 254, 251, 246; 427/391, 385 B, 385 C; 260/42.14, 42.5, 42.32, 42.33, 875, 876 B, 876 R, 878 B

[56] References Cited

U.S. PATENT DOCUMENTS

| | | | |
|---|---|---|---|
| 3,239,478 | 3/1966 | Harlan | 260/876 X |
| 3,542,596 | 11/1970 | Arrance | 429/254 X |
| 3,625,771 | 12/1971 | Arrance et al. | 429/136 |
| 3,639,508 | 2/1972 | Kambeur | 260/876 |
| 3,749,604 | 7/1973 | Langer et al. | 429/136 |
| 3,861,963 | 1/1975 | Arrance et al. | 429/136 X |
| 3,880,953 | 4/1975 | Downey | 260/876 B |
| 3,917,607 | 11/1975 | Crossland et al. | 260/876 X |

*Primary Examiner*—Michael R. Lusignan
*Attorney, Agent, or Firm*—N. T. Musial; J. R. Manning; J. A. Mackin

[57] ABSTRACT

There is disclosed a flexible separator for use between the electrodes of Ni-Cd and Ni-Zn batteries using alkaline electrolytes. The separator is made by coating a porous substrate such as sheets or mats of asbestos or other materials with a battery separator composition. The coating material includes a rubber-based resin copolymer, a plasticizer and inorganic and organic fillers which comprise 55% by volume or less of the coating as finally dried. One or more of the filler materials, whether organic or inorganic, is preferably active with the alkaline electrolyte to produce pores in the separator coating. The plasticizer is an organic additive such as a material which is hydrolyzed by the alkaline electrolyte to improve conductivity of the separator coating.

17 Claims, No Drawings

INORGANIC-ORGANIC SEPARATORS FOR ALKALINE BATTERIES

ORIGIN OF THE INVENTION

This invention was made by an employee of the United States Government and may be manufactured or used by or for the Government of the United States without the payment of any royalties thereon or therefor.

BACKGROUND OF THE INVENTION

This invention relates to battery separators and is directed more particularly to a separator for use between the electrodes of Ni-Cd and Ni-Zn alkaline electromotive force (EMF) cells or batteries.

In recent years there has been an upsurge of interest in the electric automobile due to pollution problems with internal combustion engines and, also, because of the energy crisis. Accordingly, there has been a parallel increase in work on batteries or cells suitable for powering electric vehicles.

Lead-acid batteries have been used in the past for electric automobiles and are currently in use for dollies and vehicles used in factories. The high-weight and expense which results from providing a sufficient number of batteries to achieve a practical range of operation for an electric automobile is too great to make such vehicles acceptable to the general public.

Prime candidates to replace the lead-acid battery are the Ni-Cd and Ni-Zn alkaline batteries. However, it has been found that the nickel electrodes of such batteries are subject to warping after relatively short usage. This requires that the separators between the nickel and zinc or cadmium electrodes be highly flexible so as to prevent cracking and disintegration of the separator and the consequent shorting of the electrodes.

Another objective which must be met with regard to Ni-Cd and Ni-Zn alkaline batteries is the reduction of cost to an acceptable level. Because the cost of the separators is a significant portion of the total cost of an Ni-Cd or Ni-Zn alkaline cell, a reduction in the cost of manufacturing separators is an important factor. Thus, a separator which utilizes low cost materials and which is easy to manufacture is desirable.

OBJECTS AND SUMMARY OF THE INVENTION

It is an object of the invention to provide highly flexible separators for use between electrodes of Ni-Cd and Ni-Zn alkaline EMF cells.

It is also an object of the invention to provide such separators which are, in addition to being flexible, highly resistant to damage from alkaline electrolytes.

It is another object of the invention to provide alkaline battery separators which may be produced very inexpensively by automated machinery.

Another object of the invention is to provide battery separators which strongly inhibit zinc dendrite and nodule growth in Ni-Zn alkaline batteries.

Still another object of the invention is to provide a flexible separator having a surface which is continuous and free of defects and wherein the interior structure of the separator coating is comprised of particles and voids which are relatively uniform in size and distribution to achieve a uniform current density over the surfaces of the electrodes.

A further object of the invention is to provide a porous, flexible separator which greatly extends the life of Ni-Cd and Ni-Zn alkaline batteries.

An additional object of the invention is to provide a separator for alkaline batteries using nickel electrodes for one pole, which separator utilizes low cost materials.

It is yet another object of the invention to provide a flexible, porous, alkaline battery separator having good conductivity although containing an amount of polymeric material greater than 40% by volume of dry materials in an amount of filler material, by volume of dry materials less than 60%.

DESCRIPTION OF A PREFERRED EMBODIMENT

According to the invention, a flexible porous battery separator for an alkaline cell is made by coating a flexible, porous substrate with a slurry comprised of a copolymer or rubber based resin, a plasticizer, which reacts with the alkaline electrolyte to produce a short chain (two or three carbon) alcohol or glycol, trichloroethylene or chloroform, an inorganic or organic filler which is inert to the alkaline electrolyte and a pore-forming inorganic filler which is reactive with the alkaline electrolyte. The preferred electrolyte is KOH although NaOH can be used.

The flexible porous substrate can be asbestos sheets or other non-woven substrates such as nylon or other polymeric materials known in the prior art. Because of the flexibility of the inorganic separator material formulated in accordance with the invention, the slurry of inorganic separator material may be applied to a moving web of flexible substrate material by automated equipment. The coating is then dried and, as permitted by the high flexibility of the coating, the coated substrate is collected on a roller.

Thus, because the battery separators made in accordance with the invention may be easily processed mechanically, production costs are kept low. The substrate material may be formed into boxes or envelopes to enclose a battery electrode as taught by the prior art. This may be done either before or after coating the substrate material.

According to the prior art, particularly as taught by U.S. Pat. No. 3,861,963 to Arrance et al, the amount of ceramic powder and potassium titanate fibers together in an alkaline battery separator should be at least 50%, and preferably substantially greater than 50% of the mixture, and the amount of either the ceramic material or the potassium titanate can be less than or in excess of 50% of the mixture. The patent further teaches that, ordinarily, the inorganic or ceramic material is present in major proportion and the potassium titanate in minor proportion. Further, the amount of polymeric material can vary widely and can constitute as much as 50% or more of the mixture, but under these conditions the result is a separator of increased internal resistance, although having greater flexibility.

According to the prior art, in preferred practice the organic polymeric material is employed in minor proportions to obtain sufficient bonding and porosity to afford substantial flexibility. The organic polymeric material preferably ranges from about 2% to about 35% by weight, according to U.S. Pat. No. 3,861,963 to Arrance et al at column 8, lines 26 through 46.

Applicant prefers that the polymeric or rubber based resin materials be greater than 50% by weight up to 80% by weight of the inorganic-organic separator coating material. This is made possible by use of plasticizer which reacts with an alkaline electrolyte to form short chain (2 or 3 carbon atoms) alcohol or glycol, thereby decreasing resistivity of the separator material. By volume, Applicant's invention utilizes 10–50% filler materials in the finally dried separator coating with about 30% being preferred.

According to the prior art, the filler material used for battery separator for alkaline batteries were inert materials such as potassium titanate, calcium stabilized zirconium oxide, magnesium silicate, zinc silicate, iron silicate and materials such as alumino silicates. In separators embodying the present invention, a reactive filler material selected from the group consisting of calcium silicate, silicon dioxide (silica) and alumina having a particle size of from 0.01 micron ($0.01 \times 10^{-6}$ meters) to 3 microns, when incorporated in the other unreactive or inert filler material(s), react with the alkaline electrolyte to form pores in the separator coating.

The reaction of the $CaSiO_3$ with the alkaline electrolyte, for example, produces a flocculent precipitate which, together with the inert filler material, reduces the diameter of the pores present in the finished separator. When one of the electrodes is Zn, the small pore size retards movement of zincate ions through the separator to minimize the growth of zinc dendrites which can short-circuit the electrodes, for example, between Ni-Zn. When $SiO_2$ is used as a pore forming filler, the flocculent precipitate does not form.

It is believed that the calcium silicate reacting in the alkaline-rich electrolyte forms a low molecular weight soluble silicate and insoluble calcium hydroxide. The calcium hydroxide may be capable of reaction with zincate ion, thus forming insoluble calcium zincate. The silicon dioxide appears to react with the alkaline electrolyte to form soluble polymeric silicate anions.

Inert filler materials which have been found to be satisfactory for use in alkaline battery separator coatings embodying the invention include low cost materials such as various titanates, mixed silicates, zirconates and/or organic materials such as polyethylene spheres, wood flour, cotton flock, lignins, or naturally occurring fibrous materials having a fiber diameter or particle diameter from about 0.1 micron to 20 microns.

TABLE I

| INGREDIENT | No. 1 | No. 2 | No. 3 | No. 4 | No. 5 |
|---|---|---|---|---|---|
| Rubber based resin | 50 | 50 | 50 | 50 | 40 – 60 |
| Chlorinated hydrocarbon solvent | 600 | 650 | 600 | 600 | As required |
| Plasticizer | 20 | 20 | — | 20 | 20 – 50 |
| Calcium Silicate | 50 | 50 | 10 to 100 | — | 10 – 100 |
| Inert Fillers | 25 | — | — | 25 | 10 – 100 |
| Silica | 2 | 2 | — | — | 2 – 20 |
| alumina | — | — | — | 10 – 100 | 10 – 100 |

Separator Coating Composition, Parts by Weight

Referring now to Table I above, there are shown formulations for 5 alkaline battery separator coatings made in accordance with the invention. The steps in making each of the five exemplary battery separator coatings are as follows:

The copolymer or rubber based resin powder is dissolved in one or more chlorinated hydrocarbon solvents such as chloroform or other suitable solvents such as, but not limited to, toluene or trichloroethylene by subjecting the mixture to heat. Preferably, this is done by a high speed blender which causes high shear forces in the mixture. The plasticizer is added after the rubber based resin or polymer is dissolved and the mixing is continued.

The filler materials are placed in a porcelain ball mill and the mixture from the blender is then added. Alternatively, the filler materials may be added to the mixture in the blender and thoroughly mixed in.

This composition is then placed in the ball mill. The ball mill is operated for sufficient time to produce a smooth, lump-free slurry. In general, this step takes on the order of at least 20 hours.

The slurry is then coated onto an asbestos sheet or other web-type substrates at about 10–20 mils wet thickness. The coating may be applied by using a roller, a knife edge or by dipping the asbestos sheet in the slurry or by automated equipment. The coating is then dried (dry thickness: 1.5 to 3.5 mils) and yields a flexible porous separator suitable for use in an alkaline battery, particularly a battery using KOH electrolyte.

The rubber based resin or polymer is a block copolymer selected from the group of thermoplastic rubbers consisting of chains of three blocks - an elastomeric block in the center and a thermoplastic (polystyrene) block on each end. The elastomeric midblock is an ethylene-butylene rubber. Other types have polybutadiene midblocks or polyisoprene midblocks.

Very good separators have been produced where the coating includes a copolymer of styrene and ethylene-butylene rubber. One such copolymer is Kraton G.

The plasticizer is preferably, but not necessarily, selected from materials which react with the alkaline electrolyte to produce a short chain (two or three carbon atoms) alcohol or glycol for good conductivity. Commercially available epoxidized soyabean oil has been found to make a very satisfactory plasticizer. Polymeric polyester plasticizers of ethylene or propylene glycol and azelaic acid as well as polymeric or polyester plastidizers of ethylene or propylene glycol and adipic acid have been found to be suitable in this application.

Lead titanate and calcium silicate as inert and reactive fillers, respectively, when combined with the copolymers and plasticizers previously described as in Example 1 of Table I and coated on a paper substrate, for example newsprint, form a superior alkaline battery separator.

The flexible substrate to which the separator coating is applied may be any desired thickness. However, the object of flexibility is very important and mandates a relatively thin substrate. Fuel-cell grade asbestos sheets about 10 mils thick are very satisfactory. Ordinary newsprint (paper) when coated with the separator material of the instant invention makes an excellent separator for use between the electrodes of an alkaline battery.

The materials listed in Table I are intended to be exemplary and not limiting. Solvents other than trichloroethylene or chloroform may be used and the amount may vary the requirement being that the rubber based resin or polymer is seen to completely dissolve although this may not be true in a strict chemical sense.

As indicated previously, the rubber based resin or copolymer comprises between 50 and 80% by volume of the separator coating material. The filler material, that is a reactive filler material and an inert filler material, comprise from less than 50% down to about 25% by volume of the separator material formulation with about 30% being preferred.

Of the filler materials used, it is preferable that the reactive filler material be less than 50% by volume of the total filler material. The inert filler material may include one or more inert-filler materials mixed in various proportions.

It will be understood that changes and modifications to the abovedescribed invention may be made by those skilled in the art without departing from the spirit and scope of the invention as set forth in the claims appended hereto.

What is claimed is:

1. A method of making a flexible, porous, separator for an alkaline EMF cell comprising the steps of:
    dissolving in a solvent a thermoplastic rubber of the type made up of chains of 3-blocks wherein the middle block is an elastomer and each end block is thermoplastic;
    mixing a first filler material inert to said alkaline electrolyte and a second-pore forming filler material reactive with said alkaline electrolyte;
    combining the filler materials and the dissolved thermoplastic rubber to form a slurry;
    coating said slurry on a flexible non-metallic substrate; and
    drying said coating.

2. The method of claim 1 wherein a polyester selected from the group of esters consisting of hydroxyethyl and hydroxypropyl esters of adipic and azelaic acids is added to the dissolved thermoplastic rubber.

3. The method of claim 1 wherein epoxidized soyabean oil is added to the dissolved thermoplastic rubber.

4. The method of claim 1 wherein said elastomer is ethylene-butylene rubber.

5. The method of claim 1 wherein said slurry includes between 50-80 volume percent of said thermoplastic rubber.

6. The method of claim 1 wherein said slurry coating is from about 10 to about 20 mils thick.

7. The method of claim 1 wherein said slurry is comprised of parts by weight: 40-50 of rubber based resin; sufficient solvent to dissolve the resin; and 10 to 100 of calcium silicate.

8. The method of claim 7 and including by parts weight: 10 to 100 of at least one inert filler; 2-20 of silica and 10-100 of alumina.

9. The method of claim 8 and including by parts weight: 20-50 of a plasticizer selected from the group of esters consisting of hydroxyethyl and hydroxypropyl esters of adipic and azeliac acids.

10. The method of claim 8 and including by parts weight: 20-50 of epoxidized soyabean oil.

11. The method of claim 1 wherein said substrate is paper.

12. The method of claim 1 wherein said solvent is a chlorinated hydrocarbon solvent.

13. The method of claim 12 wherein said solvent is chloroform.

14. The method of claim 1 wherein said first inert filler is lead titanate and said second pore-forming filler is calcium silicate.

15. The method of claim 14 wherein said calcium silicate is less than 50% by volume of the total filler material.

16. The method of claim 15 wherein the total filler material is between 25% and less than 50% by volume of said slurry, excluding the solvent.

17. The method of claim 1 wherein said thermoplastic rubber is polystyrene.

* * * * *